May 22, 1934. C. H. PHELPS 1,959,642
CAMBER GAUGE FOR TESTING THE CAMBER OF STEERING WHEELS OF MOTOR VEHICLES
Filed Jan. 6, 1933
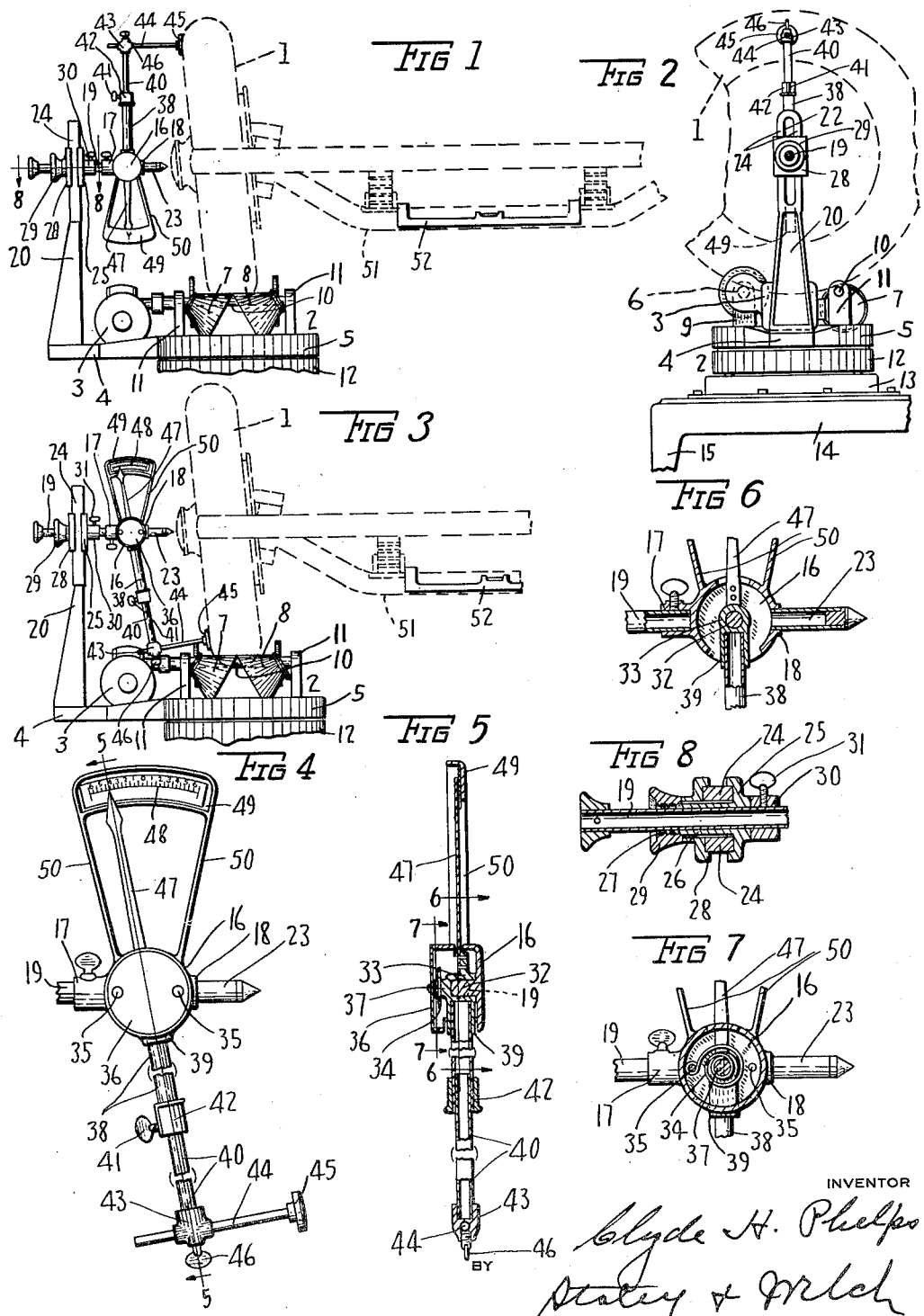
INVENTOR
Clyde H. Phelps
BY
Staley & Welch
ATTORNEYS Patented May 22, 1934

1,959,642

UNITED STATES PATENT OFFICE 1,959,642

CAMBER GAUGE FOR TESTING THE CAMBER OF STEERING WHEELS OF MOTOR VEHICLES

Clyde H. Phelps, Mount Vernon, N. Y., assignor to The Riess Manufacturing Company, Kokomo, Ind., a corporation of Indiana Application January 6, 1933, Serial No. 650,438

8 Claims. (Cl. 33—203)

This invention relates to improvements in gauges for testing the camber of steering wheels of motor vehicles.

The object of the invention is to provide a gauge which is rotatable by and with the vehicle wheel but mounted for rotatable movement on a support which is independent of the wheel, in connection with indicating means which is automatically operated when the gauge and wheel are moved from one position to another.

Fig. 1 is a front elevation of a portion of a motor vehicle shown conventionally in broken lines, the right steering wheel of which is resting on a wheel-supporting device, the camber gauge being shown in one position of the camber measurement operation.

Fig. 2 is a fragmentary side elevation of the parts shown in Fig. 1.

Fig. 3 is a view similar to Fig. 1, but having the gauge in the final position of the camber measurement test.

Fig. 4 is an enlarged front elevation of the gauge shown in Fig. 3 in the same angular position as in that figure.

Fig. 5 is a vertical section on the line 5—5 of Fig. 4.

Figs. 6 and 7 are vertical sections on the lines 6—6 and 7—7, respectively, of Fig. 5.

Fig. 8 is an enlarged section on the line 8—8 of Fig. 1.

Referring to the drawing, 1 represents the right steering wheel of a vehicle shown resting on a wheel supporting unit 2 which is one of a pair of such implements employed for the purpose, the left wheel and support for the same not being shown in the present instance. These supports are fully described and shown in my co-pending application Serial No. 650,435, filed January 6th, 1933. The operation of making a camber measurement is more conveniently and accurately performed by the use of these wheel supports, as the gauge is of a type which is rotatably mounted on an accurately leveled shaft carried in a support other than the wheel itself, and in the initial and final positions of the gauge, contact is made with the wheel at the same place, such as on the side of the tire, the wheel being rotated through 180 degrees from the initial to the final position of the gauge.

Rotation of the wheel during the test is brought about by the use of an electric motor 3 secured to an outwardly and radially projecting portion 4 of the member 5 of the wheel supporting device. The motor is connected by gearing (not shown) to a power roller 6 transversely disposed to the travel of the wheel; the roller 6 cooperates with the idle rollers 7 and 8 to support the wheel and the weight carried thereon. The roller 6 is rotatably mounted in the upper ends of vertical standards 9, and the idle rollers 7 and 8 are carried by a shaft 10 which is rotatably mounted in the upper ends of the standards 11, the standards 9 and 11 being integrally attached to the upper surface of the member 5, and equi-distantly spaced with relation to the center thereof. The member 5 is mounted on a base 14 having intermediate members 12 and 13 interposed therebetween, the base resting on the floor or other support, one leg 15, of which a plurality are used, being shown in Fig. 2.

The gauge consists of a head to which is pivotally connected an indicating pointer which cooperates with a scale graduated in degrees and fractions thereof from a central zero point and ascending on each side of the zero point carried by an extended portion of the body. The head is a cup-shaped member 16, into a boss 17 of which is fixed one end of a shaft 19 which acts as a support for the gauge, and about whose axis the gauge is rotated from the initial to the final gauge settings in the camber test. The shaft 19 is, therefore, rotatably mounted, its mounting being in the central portion of an adjustable clamping device which is fitted to a vertically disposed post 20 attached to the center of the projecting portion 4 of the member 5, the entire support being accurately leveled in order that the shaft 19 will be level.

The test for camber is preferably carried out with the axis of the shaft 19 positioned at substantially the same height as the axis of the wheel. Fore and aft alignment is insured since the shaft passes through the center of the clamping device which is inserted in the centrally located slot 22 in the post 20. A simple means for determining the proper height of the shaft is afforded by the use of a locator 23 fixed in a boss 18 of the body 16. Figs. 1 and 3 show the gauge placed at the approximate desired height, the point of the locator being adjacent the center of the hub cap of the wheel. It is not essential that the locator make contact with the wheel.

In Fig. 8 the clamping device is shown in detail in cross-section. The portions indicated at 24 are portions of the post 20 surrounding the slot 22. The head 25 of the clamping device is provided with an elongated hollow hub 26 terminating in a hollow threaded extension 27, and is slidably fitted to the inner side of the post 20, having the hub 26 inserted outwardly through the slot 22. Means for clamping the head 25 to the post is provided by the use of a flat member 28 having a central opening through which the hub 26 is inserted, while on the extended threaded portion 27 is employed a nut 29, which when tightened clamps the head to the post. The shaft 19 is rotatably mounted in the bore of the hollow hub 26. Lateral adjustment of the gauge is afforded by the use of a loose collar 30 mounted on the shaft 19 interposed between the inner end of the head 25 and the body 15, and when in use is positioned against the inner side of the head 25. The collar is provided with a set screw 31, which when tightened down prevents outward longitudinal movement of the shaft 19.

The indicating member is pivotally mounted on an integral stud 32 formed in the central portion of the cup-shaped body members 16, it having a hub 33 in which an opening is provided adapted to be revolubly mounted on the stud 32. The indicator is moved against the resistance of a spiral spring 34, one end of the spring 34 having an eye formed therein through which one of the screws 35 which retain a cap 36 in place is inserted. The other end of the spring 34 is inserted in a cross-wise opening in a cylindrical extension 37 of the indicator hub member 33.

Contact with the wheel is made by a telescoping rod consisting of a tubular member 38 inserted in a radially disposed boss 39 integrally attached to the indicator hub 33, and a tubular rod 40 slidably inserted in the tubular member 38 and retained in any suitably extended position by a set screw 41 passing through the head 42 attached to the tubular member 38. The rod 40 terminates in a cross-head 43 in which is slidably mounted at right angles to the rod 40, a similar shaft 44 terminating in a button 45 and retained in position by a set screw 46 threaded into the cross-head 43.

Projecting from the indicator hub 33 and diametrically opposite from the telescoping rod just described is a pointer 47, the outer end of which sweeps over a scale 48 graduated in degrees. The scale 48 is in concentric relation with the axis of the indicator hub 33 and is imprinted in the portion 49 of the gauge, this portion 49 being supported by the arms 50 which are integrally attached to the body member 16 of the gauge.

In making a test for camber the axle 51 of the vehicle is brought to a level condition by any suitable means, employing the axle level 52 to determine when the axle is level. The gauge is then brought to the proper height by raising or lowering the clamping device on the post 20 and is shifted laterally until the locator 23 is closely adjacent the center of the hub cap of the wheel. The gauge is rotated about the axis of the shaft 19 until it is in the position shown in Fig. 1, i. e., having the telescoping arm extending upwardly, and with the button 45 resting against the side of the wheel, more preferably against the tire, and the pointer 47 is brought to the zero mark on the scale 48, after which the set screws 41 and 46 are tightened. The wheel is then rotated one-half turn which obviously causes a similar partial rotation of the gauge about the axis of the shaft 19, to the position shown in Fig. 3. If the wheel is cambered, as is shown by the exaggerated inclination thereof in Figs. 1 and 3, the pointer will move from the zero point to one side thereof due to the action of the spiral spring acting to maintain contact of the button with the wheel 1. The movement of the pointer 47 from the zero point is through an angle of twice the camber angle, and the camber scale is calibrated accordingly.

During the half rotation of the wheel, the gauge revolves bodily therewith, the button maintaining its contact with substantially the same surface of the wheel throughout. Therefore, the actual camber of the wheel is measured, the accuracy of the test being independent of conditions such as warped wheels or tires in poor condition, referring to bulged or sunken places thereon. Further, the test is made under road conditions, as the wheel is not relieved of any of the usual weight carried thereon, whereas in supporting the forward portion of the vehicle on supports under the axle, the wheel may assume an apparent greater angle of camber due to the overhanging weight of the wheel when the bearings are loose or out of adjustment.

Having thus described my invention, I claim:

1. In an instrument of the character described, a head, a stationary support, means for mounting said head on said support to rotate with a vehicle wheel, an indicating device carried by the head for swinging movement to and from the plane of the wheel, and means for engaging said indicating device with the wheel to cause the same and the head to rotate with the wheel.

2. In an instrument of the character described, a head, a stationary support, means for rotatably mounting said head on said support to rotate with a vehicle wheel, an indicating device carried by the head for swinging movement to and from the plane of the wheel, means for engaging said indicating device with the wheel to cause the same with the head to rotate with the wheel, and a scale carried by the head cooperating with said indicating device.

3. In an instrument of the character described, a head, means for supporting the head for rotary movement about a horizontal axis extending in the general direction of the axis of the wheel and at substantially the same height therewith, a pointer, an actuating device for said pointer mounted on said head to oscillate about an axis at right-angles to the axis of rotation of the head, and means for engaging said actuating device with the vehicle wheel for causing rotation therewith.

4. In an instrument of the character described, a head, means for supporting the head for rotary movement about a horizontal axis extending in the general direction of the axis of the wheel and at substantially the same height therewith, a pointer, an actuating device for said pointer mounted on said head to oscillate about an axis at right-angles to the axis of rotation of the head, means for engaging said actuating device with the vehicle wheel for causing rotation therewith, and a scale carried by the head cooperating with the pointer.

5. In an instrument of the character described, a stationary support, a head, means for supporting the head on the support for rotary movement about a horizontal axis extending in the general direction of the axis of the wheel and at substantially the same height therewith, indicating means, and an actuating device for said indicating means mounted on said head to oscillate about an axis at right-angles to the axis of rotation of the head, and means for engaging said actuating device with the vehicle wheel for causing rotation therewith.

6. In an instrument of the character described, a support, a head, vertically adjustable means on the support for supporting the head for rotary movement about a horizontal axis extending in the general direction of the axis of the wheel and at substantially the same height therewith, a pointer, an actuating device for said pointer mounted on said head to oscillate about an axis at right-angles to the axis of rotation of the head, and means for engaging said actuating device with the vehicle wheel for causing rotation therewith.

7. In an instrument of the character described, a head, means for supporting the head for rotary movement on a horizontal axis extending in the general direction of the axis of the wheel and at substantially the same height therewith, an elongated actuating device carried by the head and mounted to oscillate about an axis at right-angles to the axis of rotation of the head, means to hold the free end of said actuating device in engagement with the tire of the vehicle for causing rotation therewith, a scale on the head and a pointer connected with said actuating device cooperating with said scale.

8. In an instrument of the character described, a head, means for supporting the head for rotary movement about a horizontal axis extending in the general direction of the axis of the wheel and at substantially the same height therewith, an elongated actuating device carried by said head to oscillate about an axis at right-angles to the axis of rotation of the head, a laterally extending member carried by said actuating device for frictional engagement with the wheel for causing rotation therewith at a point remote from the axis of the wheel, a spring to hold said laterally extending member in frictional engagement with the wheel, a pointer connected with said actuating member, and a scale carried by the head cooperating with said pointer.

CLYDE H. PHELPS.